United States Patent Office 2,792,661
Patented May 21, 1957

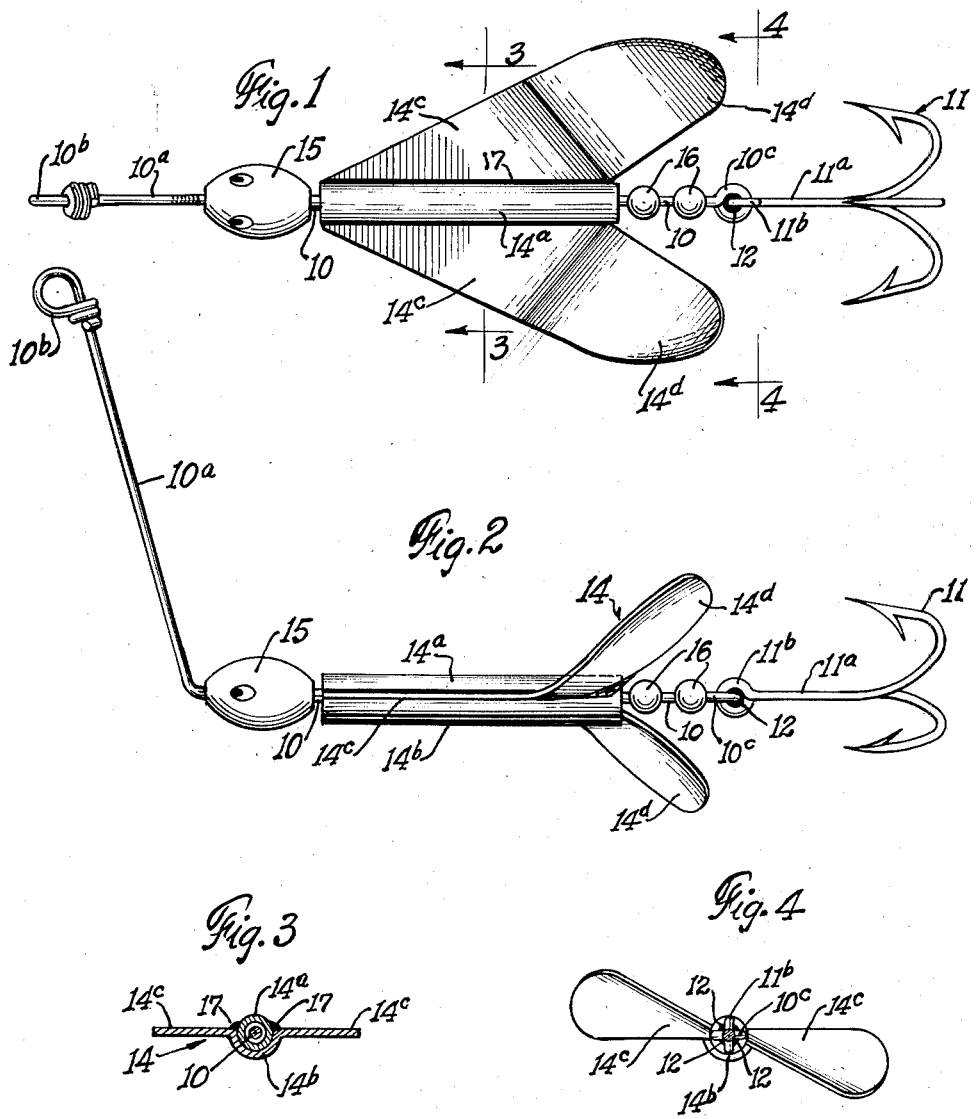

2,792,661
FISH LURE
Lynn Wesley Denby, Rogersville, Mo.

Application September 12, 1956, Serial No. 609,395

1 Claim. (Cl. 43—42.16)

This invention relates to a fishing lure for use when casting or trolling for fish.

An object of the invention is to provide a lure of the rotatable or spinner type in the shape or form of a winged insect, such as a moth, of novel structure that may readily be stamped from sheet metal and produced at comparatively low cost of manufacture.

Another object of the invention is to provide a lure with a lead-weighted oval bead adjacent to the forward or front end of the spinner, representing the head of a simulated moth, to facilitate casting and under-water fishing; the design of the lure being adapted to be reproduced in wood or plastic material for surface fishing use.

Another object of the invention is to provide a spinning lure having the wing and body portions enameled or otherwise colored to simulate the natural color of a moth to thereby enhance the effect of the lure.

Still another object of the invention is found in the provision of a spinning lure wherein a rigid wire forms the non-rotatable axis of the spinner and which axis is provided with a rigid integral extension bent relatively angularly to the axis portion and of a length substantially equal to the length of the axis portion; the long angularly bent extension being formed with a loop at its free end for connection thereto of a fish line and the remote position of the loop from the spinner preventing the spinning lure from entangling with the fish line connected to the loop.

The various features of novelty whereby the present invention is characterized will hereinafter be pointed out with particularity in the claim; but, for a full understanding of the invention and its objects and advantages, reference may be had to the following description taken in connection with the accompanying drawing, wherein:

Fig. 1 is a plan view of a fish lure embodying my invention;

Fig. 2 is a side elevation of same;

Fig. 3 is a cross-section taken on line 3—3 of Fig. 1; and

Fig. 4 is a cross-section taken on line 4—4 of Fig. 1.

In the drawing wherein like reference characters designate like or corresponding parts or members, 10 designates a straight portion of a stiff wire which is bent at its front end to form the integral relatively angularly disposed extension 10$^a$ formed at its free end with a loop 10$^b$, for connection thereto of a fish line, and at its rear end with an eye 10$^c$ for connection thereto of a suitable hook 11, preferably a treble hook having a stem 11$^a$ formed with an eye 11$^b$ for connection to the eye 10$^c$. I have found that more satisfactory results are attained with my lure when the two eyes 10$^c$ and 11$^b$ are soldered together, as designated by numeral 12, so that the hook stem 11$^a$ is at all times axially rigidly aligned in a straight line with the straight stiff wire portion 10 which functions as an axial shaft for the spinner 14 rotatably mounted thereon.

The spinner 14 is rotatably mounted on the axial wire shaft 10 between the oval-shaped bead 15, adjacent the front end of the spinner, and preferably a plurality of spherical beads 16 adjacent the rear end of the spinner. The bead 15 may be made of lead for use in under-water fishing. For surface fishing the beads 15 and 16 may be made of wood, plastic or china.

As shown on the drawing, the spinner 14 includes a central longitudinal elongate tube 14$^a$ which simulates a central portion of a body of an insect through which the wire shaft 10 extends. The structure of the spinner also includes a central longitudinal supplemental body portion 14$^b$ of substantially semicircular cross section formed with integral lateral extensions 14$^c$ simulating the wings of an insect such as a moth; the rear end portions 14$^d$ of the wings 14$^c$ being bent angularly in relatively opposite directions to impart to the spinner the rotary action of a propeller as the lure is drawn through the water.

From the foregoing description and accompanying drawing it will be observed that the spinner 14 comprises a unitary body having opposed peripheral edges diverging outwardly to produce rearwardly outwardly flarring wings 14$^c$ having end portions 14$^d$ bent angularly in opposite directions and that such body is soldered, as at 17, to the tubular body member 14$^a$ to be rotatable as a unit with it.

The foregoing description and the accompanying drawing clearly disclose a preferred embodiment of my invention but it will be understood that this disclosure is merely illustrative and that slight changes may be made by those skilled in the art to which this invention pertains without departing from the scope and spirit of the invention defined in the appended claim.

I claim:

A spinning fish lure comprising an elongated tubular member, a supplementary member of arcuate cross-section, simulating the body of an insect, soldered to the exterior of said tubular member and having laterally relatively oppositely disposed rearwardly extending integral portions simulating the wings of an insect, the end portions of said wings being bent angularly relatively in opposite directions, a stiff wire constituting a shaft extending axially through said tubular member about which said body is rotatable when the lure is drawn through water, a bead loosely mounted on the front portion of said shaft adjacent the front end of said tubular member, said shaft having an integral extension extending angularly from a point beyond the front end of said bead and an eye at the terminal end thereof for connection thereto of a fish line, said shaft extending beyond the rear end of said tubular member and carrying a fish hook on the terminal end thereof, and at least one bead mounted on said shaft between the rear end of said tubular member and said fish hook.

References Cited in the file of this patent

UNITED STATES PATENTS

| D. 175,545 | Haynes | Sept. 13, 1955 |
| 2,219,225 | Gambill | Oct. 22, 1940 |
| 2,436,730 | Worden | Feb. 10, 1948 |

FOREIGN PATENTS

| 729,629 | Great Britain | May 11, 1955 |
| 989,129 | France | May 23, 1951 |

OTHER REFERENCES

Fishing Tackle Digest (pub.); first annual edition 1946, 138 pages. Published by Paul, Richmond and Co. 227 W. Washington St., Chicago 6, Ill. Page 118 cited.